United States Patent [19]
Bissada et al.

[11] 3,834,130
[45] Sept. 10, 1974

[54] HYDROCARBON TRAP

[75] Inventors: Kadry K. Bissada; Jean B. Allison, both of Houston, Tex.

[73] Assignee: Texaco Inc., New York, N.Y.

[22] Filed: Nov. 1, 1972

[21] Appl. No.: 302,715

[52] U.S. Cl. .............. 55/316, 55/387, 23/230 EP
[51] Int. Cl. ........................................ B01d 53/04
[58] Field of Search ............. 55/67, 75, 316, 387; 23/230 EP; 285/382.7

[56] References Cited
UNITED STATES PATENTS

| | | | |
|---|---|---|---|
| 2,644,700 | 7/1953 | Woodling | 285/382.7 |
| 2,694,923 | 11/1954 | Carpenter | 23/230 EP |
| 3,174,326 | 3/1965 | Carle | 55/67 |
| 3,242,651 | 3/1966 | Arnoldi | 55/75 |
| 3,345,137 | 10/1967 | McAuliffe | 23/230 EP |
| 3,744,976 | 7/1973 | Tongue | 55/316 |

*Primary Examiner*—Charles N. Hart
*Attorney, Agent, or Firm*—T. H. Whaley; C. G. Ries

[57] ABSTRACT

Apparatus includes U-tubes having quick disconnect self-sealing connectors in which one U-tube is packed with activated alumina which is held in place by glass wool and wire gauze. Another U-tube includes activated charcoal held in place by glass wool and wire gauze. When the U-tubes are immersed in a cooling bath, they trap light hydrocarbons from a gas passing through them. The U-tube with the activated alumina traps light hydrocarbons above methane in molecular weight while the U-tube with the activated charcoal traps any methane that has passed through the activated alumina U-tube.

5 Claims, 1 Drawing Figure

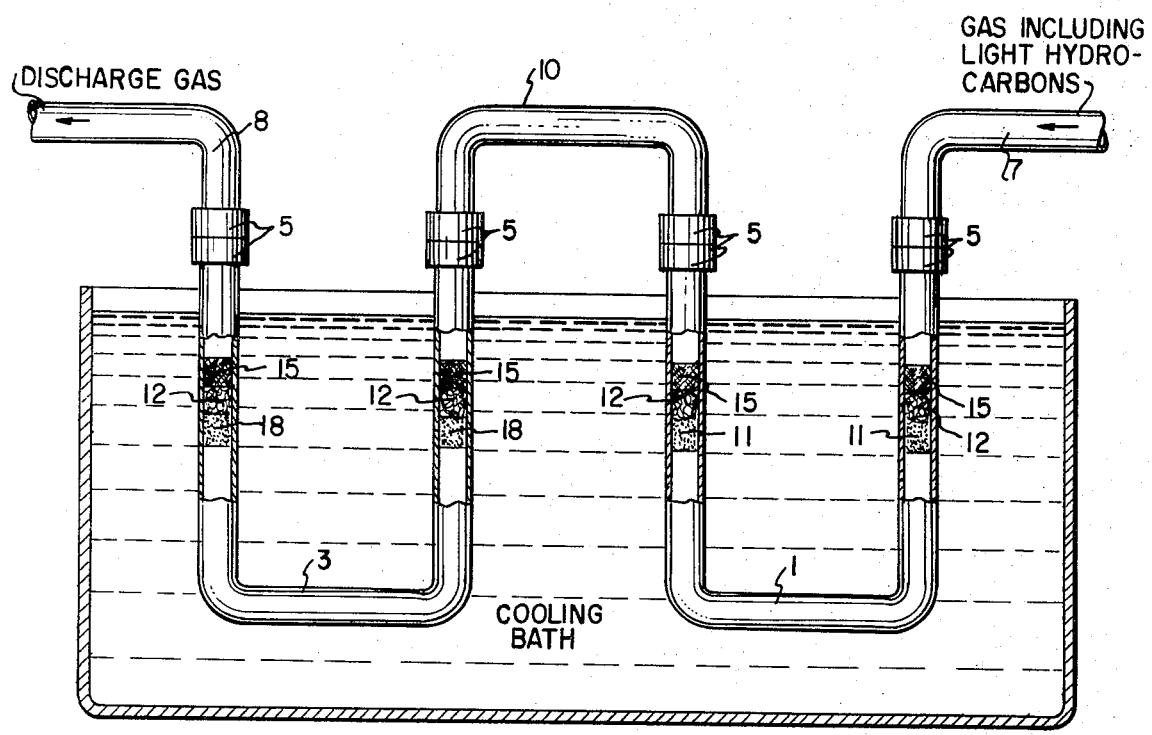

HYDROCARBON TRAP

BACKGROUND OF THE INVENTION

1. Field of the Invention

The present invention relates to apparatus for trapping light hydrocarbons for analysis purposes in general.

2. Description of the Prior Art

Heretofore hydrocarbon traps were not detachable from the system without a subsequent loss of the light hydrocarbons from the trap. The present invention uses specially treated, self-sealing connectors to retain the hydrocarbon for future analysis without substantial loss.

The apparatus of the present invention further provides for the trapping of methane as well as the light hydrocarbons above methane in molecular weight.

SUMMARY OF THE INVENTION

A light hydrocarbon trap includes a first trap having a tubular body with self-sealing connectors at either end which traps light hydrocarbons above methane in molecular weight. A first adsorbent is contained within the body by glass wool plugs and wire gauze plugs. The first trap is connected to a second trap by tubing, both ends of which are fitted with self-sealing connectors. The second trap, including a body having self-sealing connectors at either end, traps methane. A second adsorbent is contained within the body of the second trap by glass wool plugs and wire gauze plugs.

The objects and advantages of the invention will appear more fully hereinafter from a consideration of a detailed description which follows, taken together with the accompanying drawing wherein one embodiment of the invention is illustrated by way of example. It is to be expressly understood, however, that the drawing is for illustrative purposes only and is not to be construed as defining the limits of the invention.

DESCRIPTION OF THE DRAWING

The FIGURE illustrates a hydrocarbon trap, constructed in accordance with the present invention, for the trapping of light hydrocarbons from a gas.

DESCRIPTION OF THE INVENTION

Referring to the FIGURE, apparatus, hereinafter referred to as a hydrocarbon trap, for trapping light hydrocarbons from another gas includes U-tubes 1 and 3 having conventional type self-sealing quick disconnect connectors 5. Connectors 5 are quick connect double-end shut off valve assemblies such as made by the Crawford Fitting Company under their trademark Swagelok. The body and stem assemplies in connectors 5 contain instant acting buna "N" rubber o-ring seals to prevent loss of pressure from either end of a line when the body is disconnected, flow is resumed instantly when the body and stem are connected. To prevent the buna "N" rubber from slowly bleeding any intrinsic light hydrocarbons and thus contaminating the contents in the U-tubes, connectors 5 are baked in vacuo at approximately 10 torr at 90°C for 24 hours with the seals in the open mode.

The hydrocarbon trap may be used with a system for analyzing seawater or a sediment analyzing system such as disclosed in U.S. application Ser. No. 302,716 filed on Nov. 1, 1972 and assigned to Texaco Inc., assignee of the present invention. Tubing 7 and 8 belong to such a system, with tubing 7 carrying the gas with the light hydrocarbons while tubing 8 carries the discharge gas from the hydrocarbon trap. A tube 10 connects U-tubes 1, 3.

Light hydrocarbons, as used hereinbefore and hereinafter shall mean those hydrocarbons that are in a gas state prior to trapping by the hydrocarbon trap.

U-tube 1 is packed with an activated alumina 11. It has been determined that three cubic centimeters of activated alumina having 30–60 mesh is a suitable adsorbent although other quantities may also be used. Glass wool plugs 12 holds the activated alumina 11 while permitting gas to flow. Wire gauze retainers 15 prevent portions of glass wool plugs 12 and activated alumina 11 from being blown into connectors 5 which would interfere with their self-sealing features. Retainers 15 may be made from a 6 inch strip of 200 mesh brass wire gauze tightly rolled into a cylindrical plug.

Prior to installing the connectors, any fine particles adhering to the inner walls of U-tube 1 above retainers 12 are removed. After assembling, U-tube 1 is purged with zero grade helium to completely remove extraneous hydrocarbons, moisture and gas trapped within the system. Purging is continued for 30 minutes at a flow rate of 60 milliliters per minute while the lower three-fourths of U-tube 1 is immersed in a sand bath at 90°C to insure activation of the adsorbent.

U-tube 3 is packed with approximately 3 cubic centimeters of activated charcoal 18 of substantially 30–60 mesh. Glass plugs 12 and wire gauze retainers 15 are used to hold charcoal 18 in place. U-tube 3 is cleansed and purged in a manner similar to the cleansing and purging of U-tube 1, heretofore described.

With the arrangement as shown in FIG. 1, U-tubes 1, 3 are immersed in a cooling bath at substantially minus 80°C, which may be a mixture of dry ice and acetone, to reduce the temperature of the alumina 11 and charcoal 18 so as to trap light hydrocarbons.

The gas including light hydrocarbons is introduced through tube 7 and passes into U-tube 1. Activated alumina 11 traps light hydrocarbons above methane in molecular weight. The gas containing the methane continues through connecting tube 10 into U-tube 3 where activated charcoal 18 traps the methane. The remaining gas is discharged through tube 8. U-tubes 1, 3 may then be removed from the system and their contents analyzed separately by a conventional type gas chromatograph.

The apparatus of the present invention as heretofore described traps light hydrocarbons from a gas. The apparatus includes a first trap having activated alumina as an adsorbent which traps the light hydrocarbons above methane in molecular weight. Anotehr trap traps the methane in activated charcoal adsorbent.

What is claimed is:

1. A hydrocarbon trap comprising means for trapping some light hydrocarbons includes self sealing connectors, said connectors include self-sealing buna "N" rubber O-rings which have been heat treated at a predetermined temperature for a predetermined time in a predetermined manner to prevent the slow bleeding of light hydrocarbons, a body connected to the connectors, an adsorbent within the body, glass wool plugs for retaining the first adsorbent and wire guaze plugs for retaining the glass wool plugs.

2. A hydrocarbon trap as described in claim 1 in which the predetermined manner is in vacuo at approximately 10 torr, with the seals in an open mode, the predetermined temperature is substantially 90°C and the predetermined time is substantially 24 hours.

3. A hydrocarbon trap as described in claim 2 in which the first trapping means traps light hydrocarbons above methane in molecular weight, and further comprises second means for trapping methane gas includes self-sealing connectors, a second body connected to the last mentioned connectors, a second adsorbent contained with the second body, glass wool plugs for retaining the second adsorbent and wire gauze plugs for retaining the glass wool plugs; means for cooling the first and second trapping means to a predetermined temperature; and means for connecting the first trapping means to the second trapping means so that gas entering said first trapping means will pass through said first trapping means, except for the light hydrocarbons above methane in molecular weight which are trapped by the first trapping means, and into said second trapping means, where the methane is trapped by the second trapping means while the non-trapped gas is discharged.

4. A hydrocarbon trap as described in claim 3 in which the adsorbent in the first trapping means is activated alumina and the second adsorbent is activated charcoal.

5. A hydrocarbon trap as described in claim 4 in which the activated alumina is of 30–60 mesh and is in a quantity of three cubic centimeters, and the activated charcoal is of 30–60 mesh and is in a quantity of three cubic centimeters.

* * * * *